(12) United States Patent
Fritz et al.

(10) Patent No.: US 8,104,829 B2
(45) Date of Patent: Jan. 31, 2012

(54) JUVENILE MOTION-INHIBITOR SYSTEM

(75) Inventors: Ward Fritz, Chelsea, MA (US);
Andrew W. Marsden, Hingham, MA (US); Walter S Bezaniuk, Berkley, MA (US); Joe Langley, Foxboro, MA (US); Paul Brown, Attleboro, MA (US)

(73) Assignee: Cosco Management, Inc., Wilmington, DE (US)

( * ) Notice: Subject to any disclaimer, the term of this patent is extended or adjusted under 35 U.S.C. 154(b) by 194 days.

(21) Appl. No.: 12/395,169

(22) Filed: Feb. 27, 2009

(65) Prior Publication Data

US 2009/0224580 A1 Sep. 10, 2009

Related U.S. Application Data

(60) Provisional application No. 61/034,058, filed on Mar. 5, 2008.

(51) Int. Cl.
*B60N 2/42* (2006.01)
*A47C 1/08* (2006.01)

(52) U.S. Cl. ............ 297/216.11; 297/216.13; 297/250.1

(58) Field of Classification Search ............. 297/216.11, 297/216.12, 216.13
See application file for complete search history.

(56) References Cited

U.S. PATENT DOCUMENTS

| | | |
|---|---|---|
| 4,642,814 A | 2/1987 | Godfrey |
| 4,899,961 A | 2/1990 | Herndon |
| 4,919,483 A | 4/1990 | Horkey |
| 5,235,715 A | 8/1993 | Donzis |
| 5,292,175 A | 3/1994 | Artz |
| 5,292,176 A | 3/1994 | Artz |
| 5,335,968 A | 8/1994 | Sheridan et al. |
| 5,567,015 A | 10/1996 | Arias |
| 5,588,699 A * | 12/1996 | Rundle et al. ............ 297/216.11 |
| 5,881,395 A | 3/1999 | Donzis |
| 6,485,101 B2 | 11/2002 | Kassai et al. |
| 6,519,780 B2 | 2/2003 | Goodwin |
| 7,125,073 B2 | 10/2006 | Yoshida |
| 7,232,182 B2 * | 6/2007 | Yoshida ................... 297/216.11 |
| 7,234,771 B2 | 6/2007 | Nakhla |
| 7,246,853 B2 | 7/2007 | Harcourt |
| 7,293,828 B2 * | 11/2007 | Yoshida ................... 297/216.11 |
| 7,654,613 B2 * | 2/2010 | Bass ......................... 297/250.1 |
| 7,717,506 B2 | 5/2010 | Amesar et al. |
| 7,726,734 B2 | 6/2010 | Mahal et al. |
| 7,744,154 B2 | 6/2010 | Marsden et al. |
| 7,748,781 B2 | 7/2010 | Bass |
| 7,774,866 B2 | 8/2010 | Ferrara |
| 7,850,234 B2 | 12/2010 | Marsden et al. |
| 2002/0153753 A1 | 10/2002 | Kassai |
| 2007/0085394 A1 | 4/2007 | Yang |
| 2007/0252418 A1 | 11/2007 | Harcourt et al. |
| 2008/0258518 A1 | 10/2008 | Santamaria |
| 2009/0152913 A1 | 6/2009 | Amesar et al. |
| 2009/0179469 A1 | 7/2009 | Bass |
| 2009/0179470 A1 | 7/2009 | Bass |
| 2009/0256404 A1 | 10/2009 | Strong et al. |
| 2010/0019554 A1 | 1/2010 | Mahal et al. |
| 2010/0194158 A1 | 8/2010 | Mahal et al. |

* cited by examiner

*Primary Examiner* — Sarah B McPartlin
(74) *Attorney, Agent, or Firm* — Barnes & Thornburg LLP

(57) ABSTRACT

A juvenile motion-inhibitor system in accordance with the present disclosure includes a juvenile seat including a seat bottom and a seat back that is arranged to extend upwardly from the seat bottom. The juvenile motion-inhibitor system also includes one or more cushions to assist in cushioning a child in the event an external force is applied to the seat bottom or back.

9 Claims, 4 Drawing Sheets

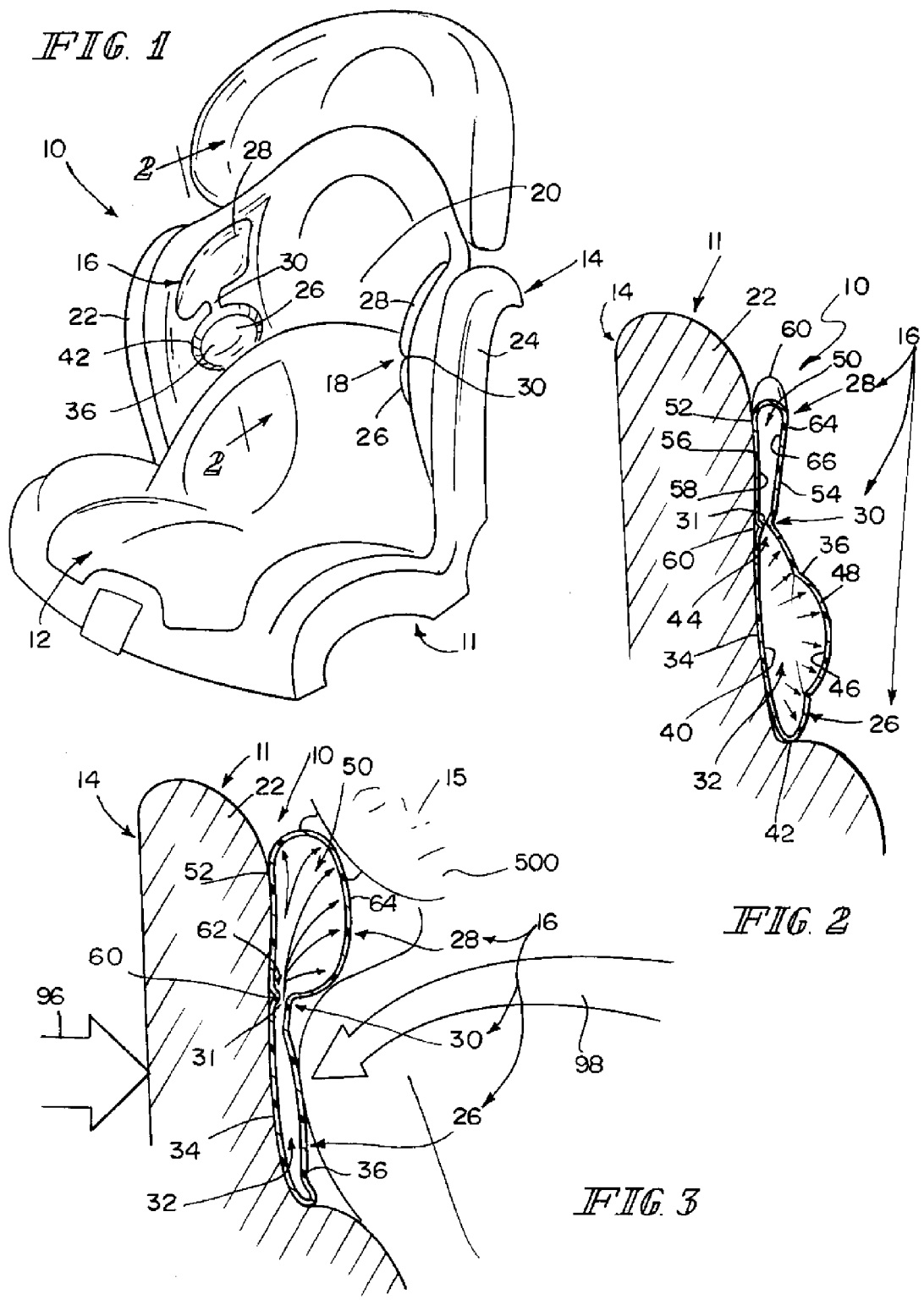

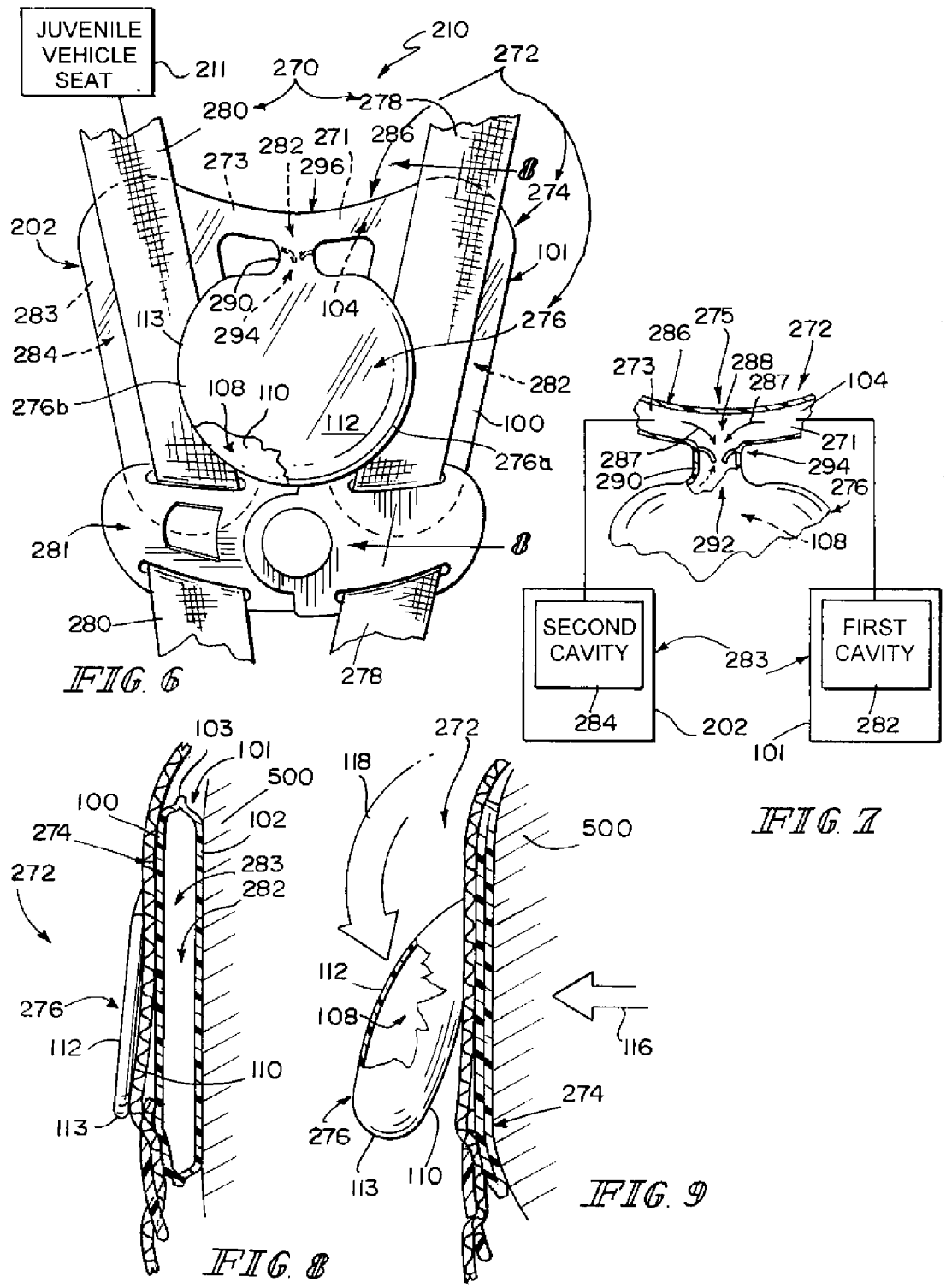

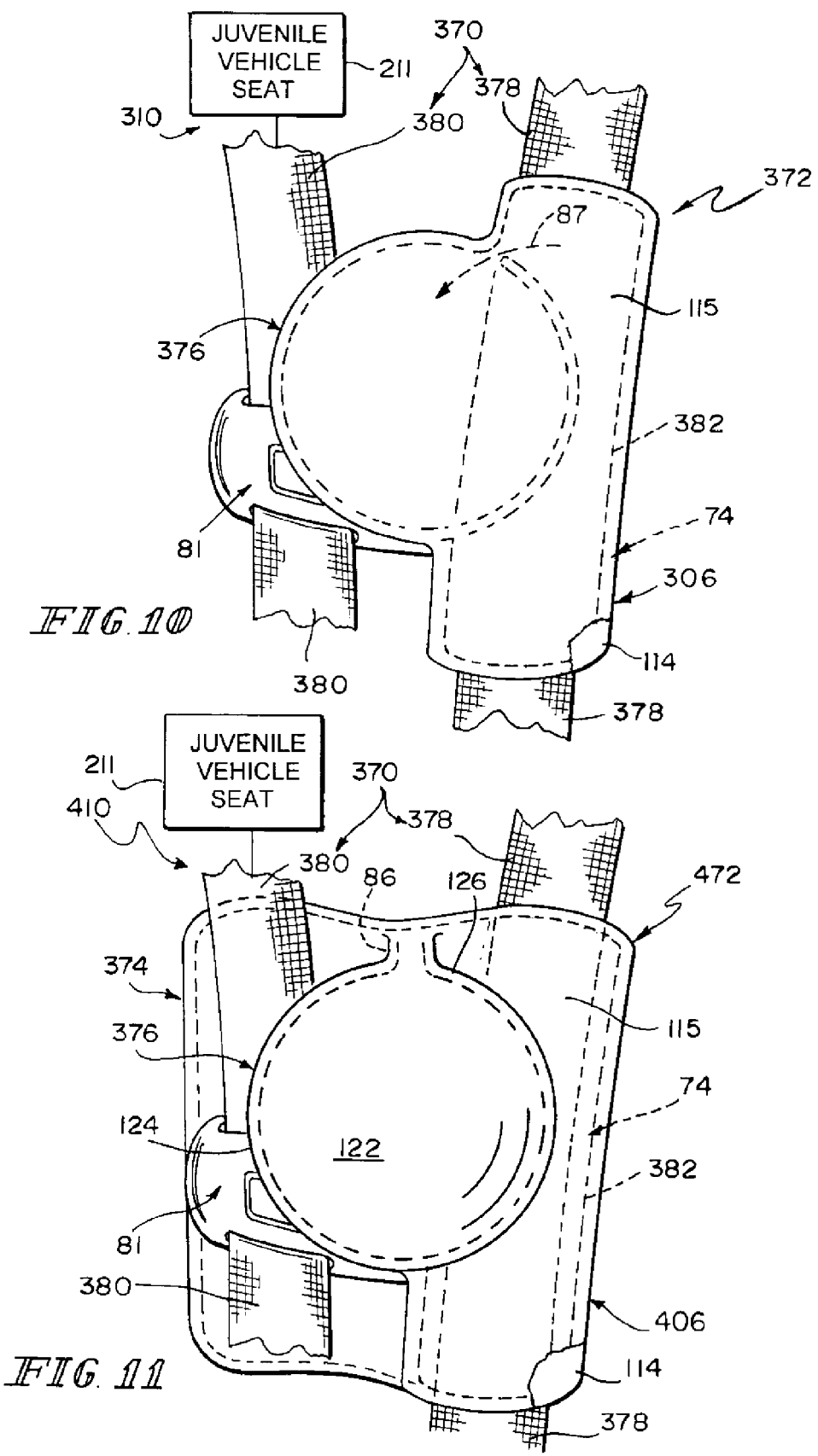

JUVENILE MOTION-INHIBITOR SYSTEM

This application claims priority under 35 U.S.C. §119(e) to U.S. Provisional Application Ser. No. 61/034,058, filed Mar. 5, 2008, which is expressly incorporated by reference herein.

BACKGROUND

The present disclosure relates to vehicle seats, and in particular, to vehicle seats having a backrest and a child-restraint harness. More particularly, the present disclosure relates to cushions for juvenile vehicle seats.

SUMMARY

A juvenile motion-inhibitor system in accordance with the present disclosure includes a juvenile seat comprising a seat bottom and a seat back that is arranged to extend upwardly from the seat bottom. The juvenile motion-inhibitor system also includes one or more cushions to assist in cushioning a child in the event an external force is applied to the seat bottom or back.

In illustrative embodiments, a juvenile motion-inhibitor system in accordance with the present disclosure includes an air-conveyance cushion including a deflatable bladder filled with air, an inflatable bladder, and an air-transfer bridge coupled to the deflatable and inflatable bladders. The air-transfer bridge includes means for conveying air (or any suitable fluid) from the deflatable bladder to the inflatable bladder to cause inflation of the inflatable bladder using air discharged from the deflatable bladder in response to exposure of the juvenile vehicle seat to an external impact.

In some illustrative embodiments, the juvenile motion-inhibitor system includes a juvenile vehicle seat and an air-conveyance cushion coupled to the juvenile vehicle seat. In an illustrative embodiment, the seat back includes a pair of side wings and each side wing is arranged to lie on one side of a juvenile seated on the seat bottom. Each side wing carries an air-conveyance cushion that includes a deflatable bladder, an inflatable bladder, and an air-transfer bridge configured to interconnect the bladder to allow for the transfer of air from the deflatable bladder to the inflatable bladder.

Each air-conveyance cushion in an illustrative embodiment is formed to include a first chamber in the deflatable bladder and a second chamber in the inflatable bladder. The air-transfer bridge is formed to include a channel that conveys air from the first chamber in the deflatable bladder into the second chamber in the inflatable bladder when the deflatable bladder is squeezed between the seat back and a child seated on the seat bottom. A one-way valve associated with both of the first and second chambers is located in the channel and configured to control air flow between the chambers through the channel.

In other illustrative embodiments, the juvenile motion-inhibitor system also includes a child-restraint harness that is coupled to the seat bottom and seat back of the juvenile vehicle seat. An illustrative child-restraint harness includes an air-conveyance cushion including a deflatable bladder. The deflatable bladder is positioned to lie between a child seated on the seat bottom of the juvenile vehicle seat and at least one of a pair of child-restraint straps included in the child-restraint harness. The air-conveyance cushion also includes an inflatable bladder that is positioned to lie forward of the deflatable bladder to trap the child-restraint straps between the bladders. The bladders are interconnected by an air-transfer bridge. The air-transfer bridge is formed to include a channel for conveying air from one or more chambers in the deflatable bladder into a chamber in the inflatable bladder.

The deflatable bladder in an illustrative air-conveyance cushion will be squeezed between the child-restraint strap(s) and a juvenile seated on the seat bottom and restrained by the strap(s) during exposure of the juvenile vehicle seat to an external impact to cause air extant in one or more chambers formed in the deflatable bladder to flow through the air-transfer bridge and into a chamber formed in the inflatable bladder to cause inflation of the inflatable bladder. A one-way valve associated with all of the chambers formed in the air-conveyance cushion is located in the channel and configured to control conveyance of air between the debatable and inflatable bladders.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a juvenile motion-inhibitor system in accordance with a first embodiment of the present disclosure including a juvenile vehicle seat having a seat base and a seat back coupled to the seat base and left-side and right-side air-conveyance cushions coupled to the seat back and arranged to lie in spaced-apart relation to one another so that a juvenile seated on a seat bottom included in the seat base is located between the air-conveyance cushions, the seat back including a backrest and first and second side wings that are interconnected by the backrest, the side wings each carrying an air-conveyance cushion including a lower deflatable bladder, an upper inflatable bladder, and an air-transfer bridge that interconnects the bladders to allow for the transfer of air from the deflatable bladder to the inflatable bladder as suggested in FIG. 3 when squeezed by the shoulder of a child seated on the seat bottom;

FIG. 2 is a sectional view taken along line 2-2 of FIG. 1 showing the right-side air-conveyance cushion coupled to the first side wing of the seat back and formed to include a pressurized first chamber in the debatable bladder and a depressurized second chamber in the inflatable bladder and showing that the air-transfer bridge is formed to include a channel for conveying air from the first chamber in the deflatable bladder into the second chamber in the inflatable bladder;

FIG. 3 is a sectional view similar to FIG. 2 showing conveyance of air from the first chamber of the deflatable bladder into the second chamber of the inflatable bladder through the channel formed in the air-transfer bridge to inflate the inflatable bladder in response to compression of the deflatable bladder between the first side wing and the right shoulder of a juvenile seated on the seat bottom caused by application of an external force to the juvenile vehicle seat;

FIG. 6 is an enlarged plan view of a portion of the child-restraint harness showing that the air-conveyance cushion includes a deflatable bladder positioned to lie between the child and a pair of child-restraint straps included in the child-harness restraint and a round inflatable bladder positioned to lie forward of the deflatable bladder to trap the child-restraint straps therebetween, the bladders are interconnected by an air-transfer bridge, and the air-transfer bridge is formed to include a channel for conveying air from a first chamber formed in the deflatable bladder into a second chamber formed in the inflatable bladder;

FIG. 7 is an enlarged front elevation view of a portion of the air-conveyance cushion of FIG. 5 showing that the air-transfer bridge includes a connector tube formed to include the channel and a one-way valve that is located in the channel and configured to control conveyance of air from the deflatable bladder to the inflatable bladder;

FIG. 8 is a sectional view taken along line 8-8 of FIG. 6 showing that the first chamber formed in the deflatable bladder is filled with air and that the deflatable bladder is positioned to lie beneath a first child-restraint strap and also showing that the second chamber formed in the inflatable bladder is depressurized and maintained in a deflated state and positioned to lie forward of the child-restraint strap to trap the first child-restraint strap between the deflatable and inflatable bladders;

FIG. 9 is a sectional view similar to FIG. 8 showing application of a primary impact force to the deflatable bladder to deflate the deflatable bladder and inflate the inflatable bladder in response to conveyance of air from the air-filled first chamber to the depressurized second chamber through the channel formed in the air-transfer bridge;

FIG. 10 is an enlarged plan view of an air-conveyance cushion in accordance with still another embodiment of the present disclosure in combination with a portion of a child-restraint harness showing that the air-conveyance cushion includes a deflatable bladder represented by a phantom line and positioned to lie beneath a first child-restraint strap and a circular inflatable bladder also represented by a phantom line and located in front of the first and second child-restraint straps and arranged to cover a portion of the strap retainer, the bladders both shown encased in a cover; and FIG. 11 is a perspective view similar to FIG. 10 showing another embodiment of the cover that extends behind both first and second child-restraint straps and over both bladders of an air-conveyance cushion of the type shown in FIG. 10.

DETAILED DESCRIPTION

Figure 4:
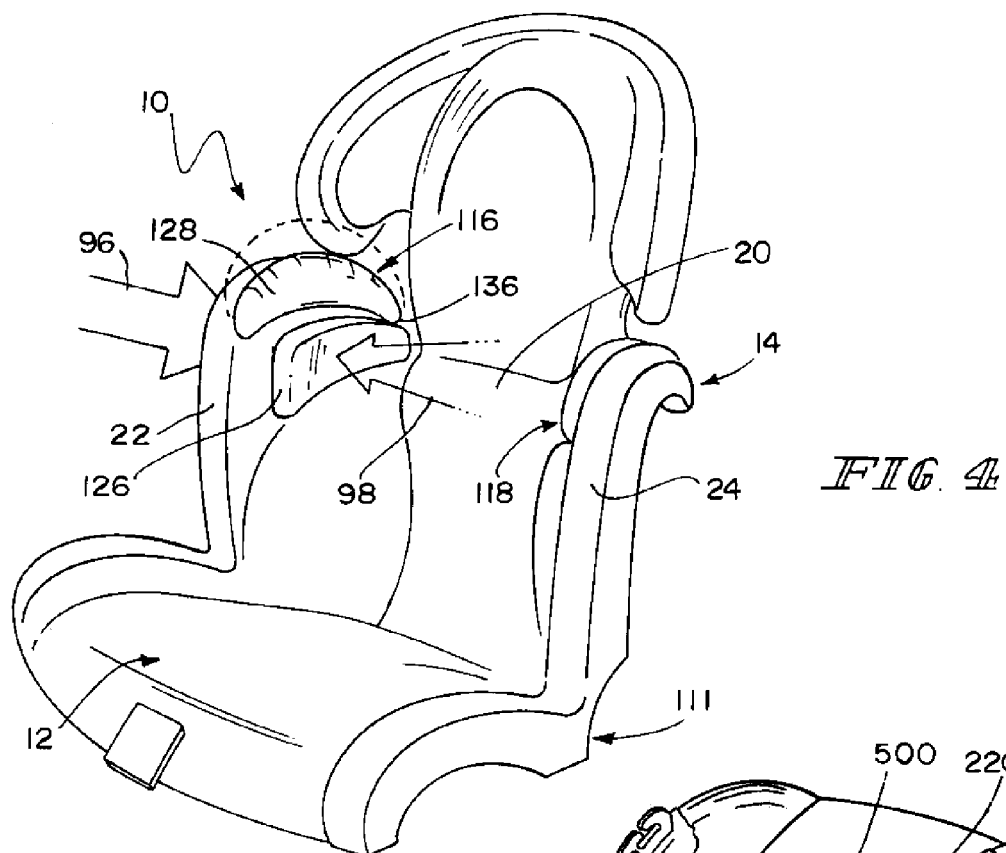
FIG. 4 is a perspective view similar to FIG. 1 showing an air-conveyance cushion in accordance with another embodiment of the present disclosure.

A juvenile motion-inhibitor system in accordance with the present disclosure includes a multi-chamber air-conveyance cushion. Air is conveyed between chambers formed in the air-conveyance cushion to inflate selected portions of the air-conveyance cushion during exposure of a juvenile vehicle seat included in the juvenile motion-inhibitor system to external impacts. Air-conveyance cushions 16, 116 in accordance with the present disclosure are coupled, respectively, to a seat back 14 included in a juvenile vehicle seat 11 as suggested in one embodiment illustrated in FIGS. 1-3 and to a seat back 14 included in a juvenile vehicle seat 111 in another embodiment illustrated in FIG. 4. Other air-conveyance cushions 272, 372, 472 in accordance with the present disclosure are coupled, respectively, to a child-restraint harness used with juvenile vehicle seats 211, 311, 411 as suggested in the embodiments shown in FIGS. 5-9, 10, and 11.

One illustrative juvenile motion-inhibitor system 10 comprises a juvenile vehicle seat 11 including a seat bottom 12 and a seat back 14 and air-conveyance cushions 16, 18 coupled to seat back 14 as suggested in FIG. 1. A backrest 20 and first and second side wings 22, 24 coupled to backrest 20 are included in seat back 14 as suggested in FIG. 1. First and second side wings 22, 24 each carry an air-conveyance cushion 16 or 18. Each air-conveyance cushion 16, 18 is formed to include a lower deflatable bladder 26, an upper inflatable bladder 28, and an air-transfer bridge 30 that fluidly couples deflatable bladder 16 to inflatable bladder 18 to allow for the conveyance of air between bladders 16, 18, as shown in FIGS. 1-3.

An illustrative juvenile motion-inhibitor system 110 comprises a juvenile vehicle seat 111 and air-conveyance cushions 116, 118 coupled to juvenile vehicle seat 111 as suggested in FIG. 4. Air-conveyance cushions 116, 118 are shaped differently than air-conveyance cushions 16, 18. Each air-conveyance cushion 116, 118 includes a deflatable bladder 126, an inflatable bladder 128, and an air-transfer bridge 130 as suggested in FIG. 4. The shapes and locations of these components are somewhat different from similar components shown in FIGS. 1-3.

Another illustrative juvenile motion-inhibitor system 210 comprises a juvenile vehicle seat 211, a child-restraint harness 270 coupled to juvenile vehicle seat 211, and an air-conveyance cushion 272 positioned to lie between a child 500 and first and second child-restraint straps 278, 280 included in child-restraint harness 270, as shown, for example, in FIGS. 5-9. Air-conveyance cushion 272 includes a deflatable bladder 274 positioned to lie between child 500 and child-restraint straps 278, 280 and an inflatable bladder 276 positioned to lie in front of child-restraint straps 278, 280. As such, at least one of child-restraint straps 278, 280 is positioned to lie between deflatable and inflatable bladders 274, 276.

In an illustrative embodiment, air-conveyance cushion 16 of juvenile motion-inhibitor system 10 includes deflatable bladder 26, inflatable bladder 28, and an air-transfer bridge 30 that interconnects bladders 26, 28 in fluid communication, as shown, for example, in FIG. 1. Air-transfer bridge 30 is positioned to lie between bladders, 26, 28 and configured to allow for the transfer of air from deflatable bladder 26 to inflatable bladder 28 when deflatable bladder 26 is squeezed between, for example, seat back 14 and the shoulder of a child 500 seated on seat base 12, as suggested in FIG. 3. Second air-conveyance cushion 18 has a similar construction in an illustrative embodiment. It is within the scope of the present disclosure to locate air-conveyance cushions 16, 18 in other suitable locations on juvenile vehicle seat 11 to dampen forces applied to a child 500 seated on juvenile vehicle seat 11 during exposure of juvenile vehicle seat 11 to external forces.

Deflatable bladder 26 of air-conveyance cushion 16 is formed to include a first chamber 32 that is adapted to contain air or other suitable fluid, e.g., pressurized air, as shown, for example, in FIG. 2. Deflatable bladder 26 also includes first and second side walls 34, 36 that cooperate to define first chamber 32 therebetween. First chamber 32 of debatable bladder 26 is sealed and otherwise configured to retain pressurized air. Air as used herein is not limited to ambient air and it is contemplated that various fluids could also be used to pressurize or otherwise fill first chamber 32, such as nitrogen or argon, for example. It is within the scope of the present disclosure to form each bladder 26, 28 in any suitable manner.

First side wall 34 of deflatable bladder 26 includes an exterior surface 38 that faces first side wing 22 and an interior surface 40 that provides a boundary of first chamber 32, as shown, for example, in FIG. 2. Second side wall 36 of deflatable bladder 26 includes an interior surface 46 that provides another boundary of first chamber 32 and an exterior surface 48 that faces child 500 sitting on seat base 12 of juvenile vehicle seat 11.

First side wall 34 of deflatable bladder 26 is connected to second side wall 34 about a perimeter edge 42 to form first chamber 32 as shown in FIG. 2. First and second side walls 34, 36 are formed to include an opening 44 that allows for the release of pressurized or other air stored within first chamber 32 of deflatable bladder 26 through air-transfer bridge 30 and into inflatable bladder 28 when deflatable bladder 26 is impacted by a child or other external force. Inflatable bladder 28 of air-conveyance cushion 16 is coupled in fluid communication to deflatable bladder 26 by air-transfer bridge 30. It is within the scope of the present disclosure to form opening 44 in only one of first and second side walls 34, 36.

Inflatable bladder 28 is formed to include a normally depressurized second chamber 50 that is configured to accept pressurized or other air discharged from first chamber 32 of deflatable bladder 26, as shown, for example, in FIGS. 2 and 3. Inflatable bladder 28 also includes a first side wall 52 and a second side wall 54 that is connected to first side wall 52. First side wall 52 of inflatable bladder 28 includes an exterior surface 56 that faces first side wing 22 and an interior surface 58 that forms a boundary of second chamber 50 as suggested in FIG. 2.

Second side wall 54 of inflatable bladder 28 includes an exterior surface 64 and an interior surface 66, as shown, for example, in FIG. 2. First side wall 52 is connected to second side wall 54 about perimeter edge 60. First and second side walls 52, 54 of inflatable bladder 28 are formed to include an opening 62 that leads to air-transfer bridge 30, as suggested in FIG. 3. Opening 62 of inflatable bladder 28 allows air from a channel 68 formed in bridge 30 to enter second chamber 50 during compression of first chamber 32 of deflatable bladder 26. It is within the scope of the present disclosure to form opening 62 in only one of first and second side walls 52, 54.

Bladders 26, 28 of air-conveyance cushion 16 are illustratively manufactured from an elastic, non-porous material that allows first and second bladders 26, 28 to retain pressurized other air or fluid within respective first and second chambers 32, 50 to provide an air cushion. Rubber as well as elastic and non-elastic polymer materials can be used to manufacture bladders 26, 28. Deflatable bladder 26 retains air within first chamber 32 prior to an external impact and is arranged to allow for conveyance of air from first chamber 32 through air-transfer bridge 30 to second chamber 50 of inflatable bladder 26 during exposure to an external impact. Bladders 26, 28, while shown as two pieces connected at a common edge, can be manufactured from a one-piece unitary (e.g., monolithic) side wall instead of two or more separate side walls.

Air-transfer bridge 30 of air-conveyance cushion 16 is formed to include a channel 68 that is used to convey air from first chamber 32 of deflatable bladder 26 into second chamber 50 of inflatable bladder 28 as shown, for example, in FIG. 3. During exposure to an external impact, air from within first chamber 32 of deflatable bladder 26 is conveyed into second chamber 50 of inflatable bladder 28 in response to compression of deflatable bladder 26 between first side wing 22 and the right shoulder of a child 500 seated on seat base 12 as a result of an external force (e.g., force 96) applied to juvenile vehicle seat 11. Air-transfer bridge 30 may also include a one-way valve 31 that is used to control the flow of air from first chamber 32 to second chamber 50. One-way valve 31 lies in channel 68 (in an illustrative embodiment) and provides means for preventing reverse flow of air from inflatable bladder 28 back into deflatable bladder 26 upon compression of inflatable bladder 28 after inflatable bladder 28 has been inflated using air conveyed from first chamber 32 in deflatable bladder 26.

While air-conveyance cushion 16 is shown as having a circular deflatable bladder 26 and rectangular inflatable bladder 28 it is contemplated that other bladder shapes could also be used within the scope of the present disclosure. As an example, air-conveyance cushion 116 may be configured to include a rectangular deflatable bladder 126 and a tubular inflatable bladder 128, as shown in FIG. 4. Air-conveyance cushion 118 has a similar shape. The shape of the bladders is determined on an installation-by-installation basis and can be modified for a particular seat design in accordance with the present disclosure to provide for a proper cushioning area to cushion a child.

During the application of an external force 96 to juvenile vehicle seat 11, a child 500 seated on seat base 12 and situated to sit between first and second side wings 22, 24 moves toward the direction of external force 96, as shown, for example, in FIG. 3. Movement of child 500 in the direction of external force 96 causes a shoulder 13 of child 500 to move in the direction of air-conveyance cushion 16 to cause an impact force 98 to strike deflatable bladder 26. The force applied to deflatable bladder 26 causes air from within first chamber 32 to be expelled through opening 44 of first chamber 32, travel through channel 68 of bridge 30, and enter into second chamber 50. Air forced into second chamber 50 from first chamber 32 inflates inflatable bladder 28 to cushion the head or other parts of child 500 during contact with inflatable bladder 28.

Compression of deflatable bladder 26 by shoulder 13 of child 500 causes air, conveyed through channel 68 of air-transfer bridge 30, to enter second chamber 50 through opening 62 and inflate inflatable bladder 28 as suggested in FIG. 3. Inflation of inflatable bladder 28 causes the expansion of first and second side walls 52, 54 to cushion or otherwise soften an impact on inflatable bladder 28 by the head 15 of a child 500, as suggested in FIG. 4. One or more air-transfer bridges 30 may be used to provide sufficient air flow to allow for the rapid conveyance of air from first chamber 32 to second chamber 50. Use of a one-way valve 31 located within channel 68 of air-transfer bridge 30 and associated with both chambers 32, 50 prevents air that has been transferred to second chamber 50 from being conveyed back to first chamber 32.

Figure 5:
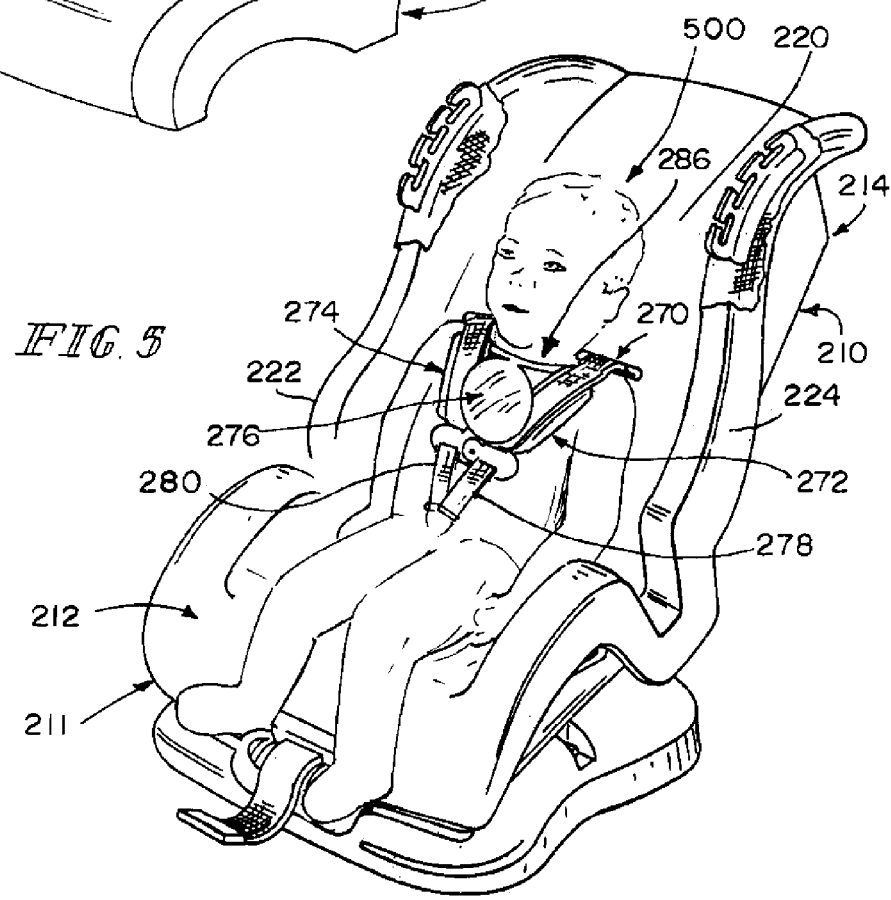
FIG. 5 is a perspective view of a juvenile motion-inhibitor system in accordance with yet another embodiment of the present disclosure including a child-restraint harness that is coupled to a seat bottom and seat back included in a juvenile vehicle seat and used to restrain a child seated on the seat bottom and showing an air-conveyance cushion coupled to the child-restraint harness.

A juvenile motion-inhibitor system 210 in accordance with yet another embodiment of the present disclosure includes child-restraint harness 270 that is coupled to seat base 212 and seat back 214 of a juvenile vehicle seat 211, as shown, for example, in FIG. 5. Child-restraint harness 270 is used to restrain a child 500 seated on seat base 212 of juvenile vehicle seat 211. Child-restraint harness 270 includes an air-conveyance cushion 272 that is coupled to child-restraint harness 270. Air-conveyance cushion 272 is formed to include a deflatable bladder 274, an inflatable bladder 276, and an air-transfer bridge 286.

Deflatable bladder 274 of air-conveyance cushion 272 is positioned to lie between a child 500 and first and second child-restraint straps 278, 280 included in child-restraint harness 270, as shown, for example, in FIG. 6. Child-restraint straps 278, 280 are coupled together in an illustrative embodiment by strap retainer 281 as suggested in FIG. 6. Deflatable bladder 274 is formed to include a first chamber 283 defined by first and second cavities 282, 284. First cavity 282 is positioned to lie between child 500 and first child-restraint strap 278 and second cavity 284 is positioned to lie between child 500 and second child-restraint strap 280. Deflatable bladder 274 may be formed to include a first chamber 283 for receiving air having at least two cavities 282, 284, as shown in FIGS. 5 and 6 or may, in other embodiments, include a single cavity 382 as shown in FIGS. 10 and 11.

First cavity 282 of deflatable bladder 274 is formed by a first side wall 100 and a second side wall 102 that cooperate to form a first pouch 101, as shown, for example, in FIG. 8. First side wall 100 is adapted to face the chest of child 500 and second side wall 102 is adapted to face child-restraint strap 278. First side wall 100 is connected to second side wall 102 about a perimeter edge 103 to form first pouch 101 and left-hand cavity 282 in first pouch 101.

Perimeter edge 103 of side walls 100, 102 in first pouch 101 is formed to include an opening 104, as shown, for example, in FIG. 6. Opening 104 is adapted to allow air from within first cavity 282 of deflatable bladder 274 to enter channel 288 of air-transfer bridge 286. Second cavity 284 is formed in a second pouch 202 that has a similar construction in an illustrative embodiment. It is within the scope of the present disclosure to form opening 104 in only one of side walls 100, 102 included in first pouch 101.

Inflatable bladder 276 of air-conveyance cushion 272 is positioned to lie forward of deflatable bladder 274 to trap first and second child-restraint straps 278, 280 between bladders 274, 276, as shown, for example, in FIG. 6. Inflatable bladder 276 of air-conveyance cushion 272 is formed to include an air-receiving chamber 108. Inflatable bladder 276 also includes a first side wall 110 and a second side wall 112 that is coupled to first side wall 110 about perimeter edge 113, as shown, for example, in FIGS. 8 and 9. First side wall 110 of inflatable bladder 276 is arranged to contact first and second child-restraint straps 278, 280 and second side wall 112 extends outwardly and is adapted to contact the chin of a child 500 during movement of the child's head as a result of an external force being applied to juvenile vehicle seat 211.

Air-conveyance cushion 272 also includes an air-transfer bridge 286, as shown, for example, in FIG. 7. Air-transfer bridge 286 is formed to include channel 288 for conducting air from cavities 282, 284, in direction 287 to air-receiving chamber 108. Air-transfer bridge 86 also includes a connector tube 290 provided with a channel 292 and a one-way valve 294 located in channel 292. Channel 292 of connector tube 290 conveys air from both cavities 282, 284 of first chamber 283 of deflatable bladder 274 to air-receiving chamber 108 of inflatable bladder 276. One-way valve 294 of connector tube 290 controls conveyance of air passing through channel 292 from deflatable bladder 274 to inflatable bladder 276.

As suggested in FIGS. 6-9, deflatable bladder 274 includes a first pouch 101 formed to include a first cavity 282 coupled in fluid communication to air-transfer bridge 286 and arranged to lie in spaced-apart relation to a first portion 276a of inflatable bladder 276 to locate first child-restraint strap 278 therebetween. Deflatable bladder 274 includes a second pouch 202 formed to include a second cavity 284 coupled in fluid communication to air-transfer bridge 286 and arranged to lie in spaced-apart relation to a second portion 276b of inflatable bladder 276 to locate second child-restraint strap 280 therebetween. First and second cavities 282, 284 cooperate to establish first chamber 283 formed in deflatable bladder 274.

As suggested in FIGS. 6 and 7, air-transfer bridge 286 is positioned to lie between first and second pouches 101, 202 of deflatable bladder 274. Air-transfer bridge 286 is positioned to lie between first and second child-restraint straps 278, 280. Air-transfer bridge 286 is substantially T-shaped and includes a first segment 271 coupled to first pouch 101 of deflatable bladder 274, a second segment 273 coupled to second pouch 202 of deflatable bladder 274 and to first segment 271 at a junction 275, and a third segment 292 coupled to inflatable bladder 276 and first and second segments 271, 273 at junction 275.

Air-conveyance cushion 372 may include an external cover 306 or 406, as shown, for example, in FIGS. 10 and 11. Cover 306, in a first embodiment, includes a rear layer 114 and a front layer 115. Rear layer 114 of cover 306 is positioned to lie behind first cavity 382 and first child-restraint strap 378. Front layer 115 of cover 306 is positioned to lie over inflatable bladder 376 and a portion of second child-restraint strap 378. Rear and front layers 114, 115 are coupled about perimeter edge 117.

Alternatively, in the embodiment of FIG. 11, rear layer 114 can extend behind first cavity 382 and second strap 380, as shown, in FIG. 11. Front cover 115 in this embodiment is arranged to extend behind inflatable bladder 376 and second child-restraint strap 380 and in front of first child-restraint strap 378. A front cover 120 is used to cover inflatable bladder 376 and includes a first side 122 and a second side 124. First side 122 faces outwardly from air-conveyance cushion 472 and may include a company logo or other visual indicia. Second side 124 is positioned to lie behind inflatable bladder 376 and is connected to first side 124 about perimeter edge 126.

During the application of an external force to the front of juvenile vehicle seat 211, a child seated on seat bottom 212 and restrained by child-restraint harness 270 moves toward the direction of the external force, as suggested in FIGS. 8 and 9. Movement of child 500 in the direction of the external force applied to juvenile vehicle seat 211 causes the chest of child 500 to move toward air-conveyance cushion 272 in direction 116 to provide a compression force 298 to the deflatable bladder 274 that is positioned between first and second child-restraint straps 278, 280 and the chest of the child. The force applied to deflatable bladder 274 causes air from within first and second cavities 282, 284 of deflatable bladder 274 to be expelled into channel 292 provided in air-transfer bridge 286 and then conveyed into air-receiving chamber 108 of inflatable bladder 276. Air from within air-receiving chamber 108 creates an inflated cushion to cushion a child's chin when child 500 moves in direction 118 and comes into contact with the inflated inflatable bladder 276.

The invention claimed is:

1. A juvenile motion-inhibitor system comprising:
   a juvenile vehicle seat;
   an air-conveyance cushion associated with the juvenile vehicle seat, wherein the air-conveyance cushion includes a deflatable bladder filled with air, an inflatable bladder, and an air-transfer bridge coupled in fluid communication to a first chamber formed in the deflatable bladder and to a second chamber formed in the inflatable bladder to provide channel means for conveying air from the first chamber in the deflatable bladder into the second chamber in the inflatable bladder to inflate the inflatable bladder in response to application of a bladder-deflating force to the deflatable bladder during exposure of the juvenile vehicle seat to an external impact;
   wherein the air-conveyance cushion further includes a one-way valve located in the channel means and associated with both of the first and second chambers and the one-way valve is configured to provide means for preventing reverse flow of air from the second chamber formed in the inflatable bladder into the first chamber formed in the deflatable bladder after the inflatable bladder has been inflated using air conveyed from the first chamber in the deflatable bladder; and
   wherein the deflatable bladder is arranged to lie in a position on an inner face of the seat back and to lie between the seat bottom and a lower extremity of the inflatable bladder.

2. The juvenile motion-inhibitor system of claim 1, wherein the air-conveyance cushion is coupled to the juvenile seat.

3. The juvenile motion-inhibitor system of claim 2, wherein the juvenile seat includes a seat bottom and a seat back arranged to extend upwardly away from the seat bottom and the air-conveyance cushion is coupled to the seat back.

4. The juvenile motion-inhibitor system of claim 3, wherein the deflatable bladder is arranged to lie in a position on the seat back between the seat bottom and the air-transfer bridge.

5. The juvenile motion-inhibitor system of claim 3, wherein the seat back includes a backrest arranged to extend upwardly from the seat bottom and first and second side wings arranged to lie in spaced-apart relation to one another to locate the backrest therebetween and cooperate with the backrest to form a juvenile-receiving space located therebetween above the seat bottom and adapted to receive a portion of a juvenile seated on the seat bottom and wherein the air-conveyance cushion is coupled to a first of the side wings and arranged to lie in the juvenile-receiving space to face toward a juvenile seated on the seat bottom.

6. The juvenile motion-inhibitor system of claim 5, wherein the first and second side wings are arranged to lie in confronting relation to one another to locate the air-conveyance cushion in a position on the first wing between the first and second side wings, and further comprising another air-conveyance cushion coupled to the second side wing and arranged to lie in a position between the second side wing and the air-conveyance cushion on the first side wing.

7. A juvenile motion-inhibitor system comprising:
a juvenile vehicle seat;
an air-conveyance cushion associated with the juvenile vehicle seat, wherein the air-conveyance cushion includes a deflatable bladder filled with air, an inflatable bladder, and an air-transfer bridge coupled in fluid communication to a first chamber formed in the deflatable bladder and to a second chamber formed in the inflatable bladder to provide channel means for conveying air from the first chamber in the deflatable bladder into the second chamber in the inflatable bladder to inflate the inflatable bladder in response to application of a bladder-deflating force to the deflatable bladder during exposure of the juvenile vehicle seat to an external impact;
wherein the air-conveyance cushion is coupled to the juvenile seat;
wherein the juvenile seat includes a seat bottom and a seat back arranged to extend upwardly away from the seat bottom and the air-conveyance cushion is coupled to the seat back;
wherein the deflatable bladder is arranged to lie in a position on the seat back between the seat bottom and the inflatable bladder;
wherein the deflatable bladder is arranged to lie in a position on an inner face of the seat back and to lie between the seat bottom and a lower extremity of the inflatable bladder; and
wherein the air-conveyance cushion further includes a one-way valve located in the channel means and associated with both of the first and second chambers and the one-way valve is configured to provide means for preventing reverse flow of air from the second chamber formed in the inflatable bladder into the first chamber formed in the deflatable bladder after the inflatable bladder has been inflated using air conveyed from the first chamber in the deflatable bladder.

8. A juvenile motion-inhibitor system comprising:
a juvenile seat including a seat bottom, a backrest extending upwardly from the seat bottom, and the first and second side wings coupled to the backrest and arranged to lie in spaced-apart relation to one another to locate the backrest therebetween and define therebetween a juvenile-receiving space adapted to receive a juvenile seated on the seat bottom;
a first air-conveyance cushion coupled to the first side wing and arranged to lie in the child-receiving-space;
a second air-conveyance cushion coupled to the second side wing to lie between the second side wing and the first air-conveyance cushion and arranged to lie in the child-receiving space in confronting spaced-apart relation to the first air-conveyance cushion, and wherein each air-conveyance cushion includes a deflatable bladder filled with air, an inflatable bladder, and an air-transfer bridge coupled in fluid communication to a first chamber formed in the deflatable bladder and to a second chamber formed in the inflatable bladder to provide channel means for conveying air from the first chamber in the deflatable bladder into the second chamber in the inflatable bladder to inflate the inflatable bladder in response to application of a bladder-deflating force to the deflatable bladder during exposure of the juvenile vehicle seat to an external impact;
wherein the first air-conveyance cushion further includes a one-way valve located in the channel means and associated with both of the first and second chambers and the one-way valve is configured to provide means for preventing reverse flow of air from the second chamber formed in the inflatable bladder into the first chamber formed in the deflatable bladder after the inflatable bladder has been inflated using air conveyed from the first chamber in the deflatable bladder; and
wherein the deflatable bladder is arranged to lie in a position on an inner face of the seat back and to lie between the seat bottom and a lower extremity of the inflatable bladder.

9. The juvenile motion-inhibitor system of claim 8, wherein the deflatable bladder of the first air-conveyance cushion is arranged to lie on the first side wing in a position between the seat bottom and the inflatable bladder of the first air-conveyance cushion and the deflatable bladder of the second air-conveyance cushion is arranged to lie on the second side wing in a position between the seat bottom and the inflatable bladder of the second air-conveyance cushion.

* * * * *